United States Patent
Raman et al.

(10) Patent No.: US 12,381,795 B2
(45) Date of Patent: Aug. 5, 2025

(54) SELF-JOIN AUTOMATED FEATURE DISCOVERY

(71) Applicant: DataRobot, Inc., Boston, MA (US)

(72) Inventors: Rishabh Raman, Washington, DC (US); Peter Simon, Overath (DE); Oleg Zarakhani, Toronto (CA)

(73) Assignee: Data Robot, Inc., Boston, MA (US)

( * ) Notice: Subject to any disclaimer, the term of this patent is extended or adjusted under 35 U.S.C. 154(b) by 0 days.

(21) Appl. No.: 18/233,936

(22) Filed: Aug. 15, 2023

(65) Prior Publication Data
US 2024/0064074 A1    Feb. 22, 2024

Related U.S. Application Data

(60) Provisional application No. 63/398,984, filed on Aug. 18, 2022.

(51) Int. Cl.
  *H04L 43/045* (2022.01)
  *H04L 43/0852* (2022.01)

(52) U.S. Cl.
  CPC ........ *H04L 43/045* (2013.01); *H04L 43/0852* (2013.01)

(58) Field of Classification Search
  CPC .... H04L 43/045; H04L 43/0852; G06N 20/00
  See application file for complete search history.

(56) References Cited

U.S. PATENT DOCUMENTS

| | | |
|---|---|---|
| 8,898,145 B2 | 11/2014 | Wang |
| 9,342,836 B2 | 5/2016 | Cronin |
| 10,216,792 B2 | 2/2019 | Brewster |
| 2006/0074881 A1 | 4/2006 | Vembu |
| 2007/0130180 A1 | 6/2007 | Rasmussen |
| 2008/0154844 A1 | 6/2008 | Gao |
| 2010/0070500 A1 | 3/2010 | Cui |
| 2012/0323885 A1 | 12/2012 | Wang |
| 2013/0328880 A1 | 12/2013 | Mande |
| 2014/0067791 A1 | 3/2014 | Idicula |
| 2016/0055205 A1 | 2/2016 | Young |

(Continued)

OTHER PUBLICATIONS

Anton Dignos, Michael H. Bohlen, and Johann Gamper, "Overlap Interval Partition Join", SIGMOD'14, Jun. 22-27, 2014, ACM, pp. 1459-1470.

(Continued)

*Primary Examiner* — Benjamin M Thieu
(74) *Attorney, Agent, or Firm* — Greenberg Traurig, LLP; Andrew J. Tibbetts; Samuel S. Stone

(57) ABSTRACT

Aspects of this technical solution can generate, according to a lag time window based at least in part on a first plurality of features, a second data set via aggregation of compatible fields in the first data set, the first plurality of features corresponding to a first data set, augment the first plurality of features extracted from the first data set with a second plurality of features extracted from a third data set, the third data set corresponding to a join of the first data set and the second data set, update, via machine learning and according to a rate corresponding to the data set, a model with the third plurality of features, and instruct a user interface to present at least one performance of the model with the third plurality of features, according to the rate.

20 Claims, 9 Drawing Sheets

(56) References Cited

U.S. PATENT DOCUMENTS

| | | | |
|---|---|---|---|
| 2016/0148850 A1 | 5/2016 | David | |
| 2017/0031990 A1 | 2/2017 | Chakkappen | |
| 2019/0095313 A1 | 3/2019 | Xu | |
| 2019/0219994 A1* | 7/2019 | Yan | G06F 18/213 |
| 2020/0160998 A1 | 5/2020 | Ward | |
| 2020/0272943 A1* | 8/2020 | Bowers | G06Q 50/01 |
| 2021/0358313 A1* | 11/2021 | Ayhan | G08G 5/0043 |
| 2022/0076164 A1 | 3/2022 | Conort | |
| 2022/0108262 A1* | 4/2022 | Cella | G05B 17/02 |
| 2023/0274195 A1* | 8/2023 | Aggarwal | G06N 20/20 |
| | | | 706/12 |

OTHER PUBLICATIONS

Brumbaugh, Eli, et al. "Bighead: a framework-agnostic, end-to-end machine learning platform." 2019 IEEE International Conference on Data Science and Advanced Analytics (Dsaa). IEEE, 2019.
Cohen, Shay B., Gideon Dror, and Eytan Ruppin. "Feature selection based on the shapley value." Proceedings of IJCAI. 2005.
International Preliminary Report of international application number PCT/US2016/049516, dated Apr. 26, 2018, 5 pp.
International Preliminary Report on PCT Appl. Ser. No. PCT/US2021/049515 dated Mar. 23, 2023 (6 pages).
International Search Report and Written Opinion of international application number PCT/US2016/049516, dated Nov. 14, 2016, 6 pp.
International Search Report and Written Opinion on PCT Appl. Ser. No. PCT/US2021/049515 dated Jan. 20, 2022 (11 pages).

* cited by examiner

FIG. 7

SELF-JOIN AUTOMATED FEATURE DISCOVERY

CROSS-REFERENCE TO RELATED PATENT APPLICATIONS

This application claims the benefit of priority under 35 U.S.C. § 119 to U.S. Provisional Patent Application Ser. No. 63/398,984, entitled "SELF-JOIN AUTOMATED FEATURE DISCOVERY," filed Aug. 18, 2022, the contents of such application being hereby incorporated by reference in its entirety and for all purposes as if completely and fully set forth herein.

TECHNICAL FIELD

The present implementations relate generally to machine learning systems, and more particularly to automated feature discovery by self-join operations.

INTRODUCTION

Understanding future behavior of complex systems is increasingly important to effective modeling of multivariate simulation systems, for example. Understanding future behavior of systems at higher level is granularity is thus desired. However, it can be challenging to efficiently and effectively provide accurate visualization of behavior that may illuminate actual historical and future behavior over time. Thus, an ability to provide and enable insight into behavior of systems over time is desired.

SUMMARY

This technical solution is directed to identifying aspects of data structures having relationships that indicate delayed effects of input stimulus, and modifying data structures to include features that identify particular relationships between particular portions of the data structures. Data structures can include data sets having one or more features and one or more points. Thus, this technical solution can achieve technical improvements including at least capturing delayed effects of time-based features at scale and across data types. This technical solution can modify data structures based on an identification of one or more features compatible with a particular time-based metric, and can generate additional features. Thus, a technological solution for automated feature discovery by self-join operations is provided.

Aspects of this technical solution are directed to a system. The system can include a data processing system comprising one or more processors and memory. The data processing system can extract a first plurality of features from a first data set. The data processing system can determine a lag time window based at least in part on the first plurality of features. The data processing system can generate, based on the lag time window, a second data set via aggregation of compatible fields in the first data set. The system can join the second data set with the first data set to create a third data set. The data processing system can extract a second plurality of features from the third data set. The data processing system can augment the first plurality of features extracted from the first data set with the second plurality of features extracted from the third data set. The data processing system can update, via machine learning, a model with the third plurality of features. The data processing system can instruct a user interface to present at least one performance of the model with the third plurality of features.

Aspects of this technical solution are directed to a method. The method can include extracting a first plurality of features from a first data set. The method can include determining a lag time window based at least in part on the first plurality of features. The method can include generating, based on the lag time window, a second data set via aggregation of compatible fields in the first data set. The method can include joining the second data set with the first data set to create a third data set. The method can include extracting a second plurality of features from the third data set. The method can include augmenting the first plurality of features extracted from the first data set with the second plurality of features extracted from the third data set. The method can include updating, via machine learning, a model with the third plurality of features. The method can include instructing a user interface to present at least one performance of the model with the third plurality of features.

Aspects of this technical solution are directed to a computer readable medium including one or more instructions stored thereon and executable by a processor. The processor can extract, by the processor, a first plurality of features from a first data set. The processor can include determine, by the processor, a lag time window based at least in part on the first plurality of features. The processor can include generate, by the processor and based on the lag time window, a second data set via aggregation of compatible fields in the first data set. The processor can join the second data set with the first data set to create a third data set. The processor can extract, by the processor, a second plurality of features from the third data set. The processor can augment, by the processor, the first plurality of features extracted from the first data set with the second plurality of features extracted from the third data set. The processor can update, by the processor and via machine learning, a model with the third plurality of features. The processor can instruct, by the processor, a user interface to present at least one performance of the model with the third plurality of features.

At least one aspect is directed to a system. The system can include a data processing system can include one or more processors and memory. The system can generate, according to a lag time window based at least in part on a first plurality of features, a second data set via aggregation of compatible fields in the first data set, the first plurality of features corresponding to a first data set. The system can augment the first plurality of features extracted from the first data set with a second plurality of features extracted from a third data set, the third data set corresponding to a join of the first data set and the second data set. The system can update, via machine learning and according to a rate corresponding to the data set, a model with the third plurality of features. The system can instruct a user interface to present at least one performance of the model with the third plurality of features, according to the rate.

At least one aspect is directed to a method. The method can include generating, according to a lag time window based at least in part on a first plurality of features, a second data set via aggregation of compatible fields in the first data set, the first plurality of features corresponding to a first data set. The method can include augmenting the first plurality of features extracted from the first data set with a second plurality of features extracted from a third data set, the third data set corresponding to a join of the first data set and the second data set. The method can include updating, via machine learning and according to a rate corresponding to the data set, a model with the third plurality of features. The method can include instructing a user interface to present at least one performance of the model with the third plurality of features, according to the rate.

At least one aspect is directed to a computer readable medium can include one or more instructions stored thereon and executable by a processor. The processor can generate, according to a lag time window based at least in part on a first plurality of features, a second data set via aggregation of compatible fields in the first data set, the first plurality of features corresponding to a first data set. The processor can augment the first plurality of features extracted from the first data set with a second plurality of features extracted from a third data set, the third data set corresponding to a join of the first data set and the second data set. The processor can update, via machine learning and according to a rate corresponding to the data set, a model with the third plurality of features. The processor can instruct a user interface to present at least one performance of the model with the third plurality of features, according to the rate.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 7 illustrates a user interface to present an example data structure in accordance with present implementations.

DETAILED DESCRIPTION

Figure 1:
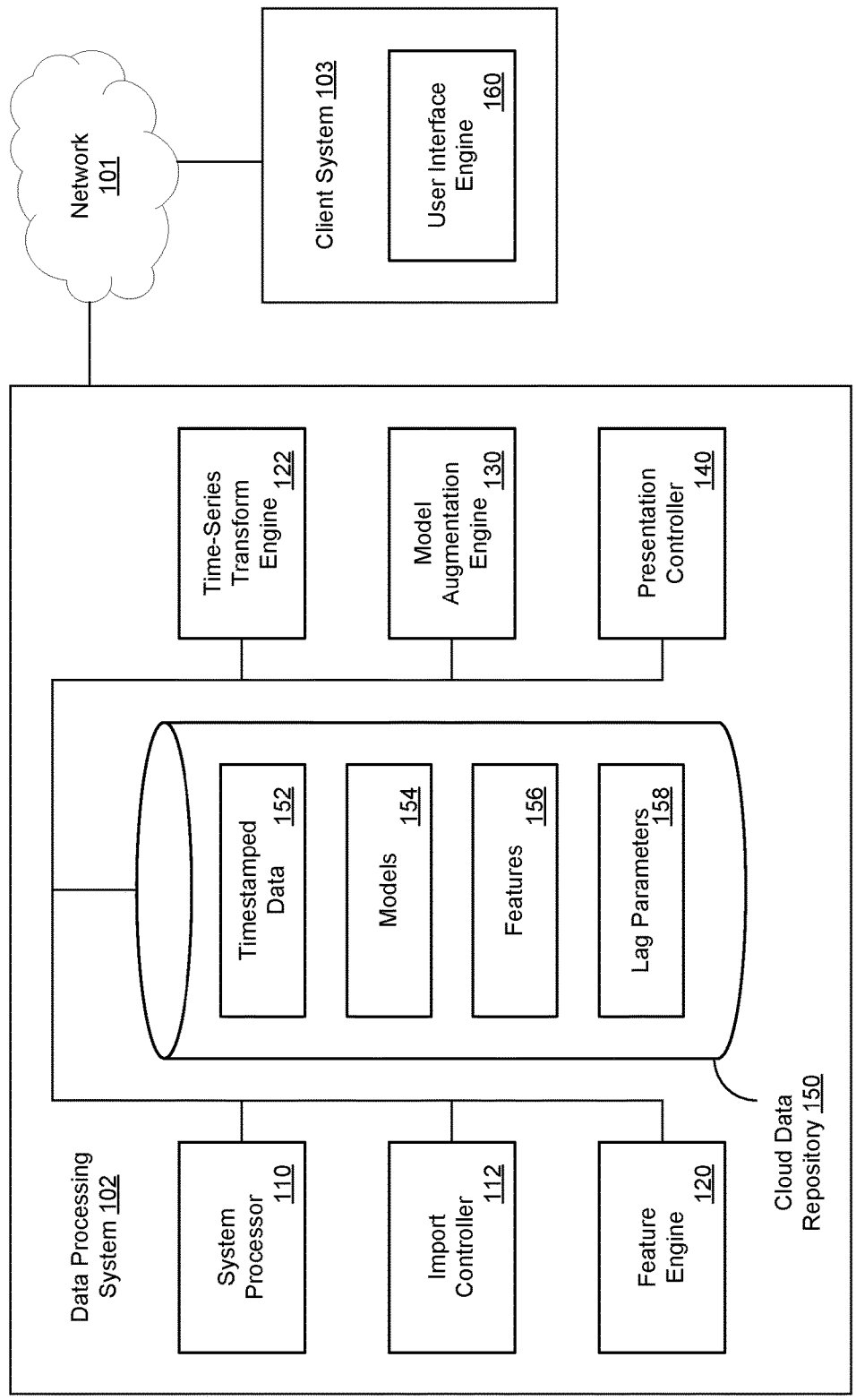
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Various features of a data set can be related or interdependent based on a time delay. For example, a change in the concentration of a particular chemical dye to a mixture may not affect a color of the mixture until a certain time period has passed. For example, a change to distribution of content presented at various display devices may not affect volume or rate of consumption of a particular product identified in the content for a day or month after the change. This technical solution can, for example, perform modification or augmentation of data sets to reflect relationships among a significant number of features can be time consuming where identified. The number of complexity of relationships among various features, including in data sets having a large number of features, can prevent identification of sufficient relationships between features having lag properties and can result in models having lower accuracy and precision.

This technical solution can model performance based on engineered features that capture the delayed effects of time based features. For example, this technical solution can identify generate one or more features having particular time-based or key-based characteristics compatible with one or more other features, and can generate new features or composite features, based on the identified features. For example, key-based characteristics can include a join key obtained by a user interface in response to user input at the user interface. For example, a TV promotion today may impact the customer to purchase the product 15-30 days later. Similarly, different macroeconomic features can influence each other in a lagged or delayed manner. This technical solution can generate features indicative of time-based features. For example, prediction of CPI inflation for a country X can be influenced by features including lag values of CPI inflation such as values 24 months ago, 12 months ago, 60 months ago and so on, and lag values of other features such as values 24 months ago, 12 months ago, 60 months ago and so on.

FIG. 1 illustrates a system in accordance with present implementations. As illustrated by way of example in FIG. 1, an example system 100 can include a network 101, a data processing system 102, and a client computing system 103. The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree.

The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network.

The data processing system 102 can include a physical computer system operatively coupled or coupleable with the network 101 and the client computing system 103, either directly or directly through an intermediate computing device or system. The data processing system 102 can include a virtual computing system, an operating system, and a communication bus to effect communication and processing. The data processing system can include a system processor 110, an import controller 112, a feature engine 120, a time-series transform engine 122, a model augmentation engine 130, a presentation controller 140, and a cloud data repository 150. One or more of the components corresponding to the data processing system 102 can include one or more logical or electronic devices including but not limited to integrated circuits, logic gates, flip flops, gate arrays, programmable gate arrays, and the like.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. The one or more instructions can include at least one of firmware, software, hardware, operating systems, embedded operating systems, and the like. The system processor 110 or the system 100 generally can include at least one communication bus controller to effect communication between the system processor 110 and the other elements of the system 100. Any electrical, electronic, or like devices, or components associated with the components corresponding to the data processing system 102 can also be associated with, integrated with, integrable with, replaced by, supplemented by, complemented by, or the like, the system processor 110 or any component thereof. The system processor 110 can obtain, by the user interface, a join key identifying the compatible fields. Each of the compatible fields can correspond to a predetermined temporal parameter or a predetermined geographic parameter. The data processing system can obtain, by the user interface, a join key identifying the compatible fields.

The import controller 112 can obtain one or more data sets, models, features, and lag parameters from the cloud data repository 150 or the network 101. For example, the import controller 112 can include one or more of a query processor, a database application programming interface (API), a database translation processor, and a stream processor. The import controller 112 can obtain one or more data sets stored at the cloud data repository 150, or available by a streaming interface connection operable to provide data of a set for an external source within one or more timing or latency constraints. A timing or latency constraint can correspond to a maximum delay between generation of a data point or group of data points and storage of the data point or group of data points at the cloud data repository 150. The import controller 112 can, for example, obtain a data set satisfying one or more particular criteria. The import controller 112 can, for example, obtain a data set having one or more data points or groups of data points satisfying a particular join key, or portion thereof. For example, the import controller 112 can obtain all data rows having timestamps within a particular range, or timestamps matching a predetermined value, label, or any combination thereof.

The feature engine 120 can identify features corresponding to particular portions of a data set or a data set as a whole. For example, the feature engine 120 can identify a feature corresponding to various categories of a data set. The feature engine 120 can generate features based on identified characteristics of the data set or of various features corresponding to the data set. For example, the feature engine 120 can identify a characteristic based on a timestamp or time offset corresponding to various data points or groups of data points. The feature engine 120 can generate a time-series characteristic corresponding to a temporal property of the data set. For example, a temporal property can include any of a time range, a time step corresponding to a minimum distance between timestamps, a window corresponding to one or more timestamps bounding one or more data points or groups of data points, or any combination thereof. The feature engine 120 can transmit one or more features and at least any temporal properties associated with those features, to the time-series transform engine 122.

The time-series transform engine 122 can generate features based on features obtained from the feature engine 120 and the temporal properties of the obtained features. The time-series transform engine 122 can identify features having matching or corresponding temporal properties, and can generate a features based on a plurality of features having the matching or corresponding temporal properties. For example, the time-series transform engine 122 can identify a plurality of features having a temporal property corresponding to a particular time step within a particular time step tolerance. For example, a time step tolerance can include a time set offset defining a range of step sizes that can be considered compatible or corresponding with each other. For example, a relative time step offset of 25% can include all time steps having a length between 75 days and 125 days, with respect to a feature having a temporal property corresponding to a time step of 100 days. For example, a unit time step offset of days can include all time steps having a length measured between 1 and 10 days, with respect to a feature having a temporal property corresponding to a time step equal to 5 days. For example, a unit time step offset of weeks can include all time steps having a length measured between 7 and 30 days, with respect to a feature having a temporal property corresponding to a time step equal to 16 days. For example, a unit time step offset of months can include all time steps having a length measured between 30 and 364 days, with respect to a feature having a temporal property corresponding to a time step equal to 231 days. For example, a unit time step offset of years can include all time steps having a length measured over 365 days, with respect to a feature having a temporal property corresponding to a time step equal to 745 days. The time-series transform engine 122 can iterate through a plurality of features and can generate composite features based on a time step offset corresponding to each feature. Thus, the time-series transform engine 122 can provide a technical improvement to generate composite features corresponding to multiple temporal properties in view of multiple permutations of combinations between particular features, at a speed of execution and at a scale of execution beyond that achievable by manual processes. For example, this technical solution can provide a technical improvement to generate and modify one or more time-series features based on one or more lag parameters at a speed that provides near-instant feedback for complex systems beyond the capability of manual processes to timely analyze before conditions for response become obsolete. The time-series transform engine 122 can transmit composite features to the model augmentation engine 130.

The model augmentation engine 130 can generate augmented data sets including any one or more of the composite features obtained from the time-series transform engine 122. The model augmentation engine 130 can execute an impact processing operation on one or more of the composite features to determine whether to include augment a model with a particular feature. For example, the model augmentation engine 130 can add a particular composite feature to a model corresponding to a particular data set from which the composite feature was generated. The model augmentation engine 130 can then execute the model with and without the feature to determine a relative impact of the feature on accuracy. If the accuracy generated by the model augmentation engine 130 satisfies an accuracy threshold, the model augmentation engine 130 can add the composite feature to the model.

The model augmentation engine 130 can perform the impact processing operation a plurality of composite features concurrently, once a plurality of component features have been identified to satisfy the accuracy threshold. The model augmentation engine 130 can select a subset of the composite features resulting in, for example, a highest accuracy metric, for augmentation into the model. The model augmentation engine 130 can add the composite features to the data set from which the composite feature was generated, and can add values associated with the composite features to the data set. For example, the model augmentation engine 130 can add composite features as columns to a tabular data set, and can add feature values to cells of the column corresponding to the data rows from which the particular values were generated. The model augmentation engine 130 can generate a new data set based on the original data set from which the composite features were generated, or can modify or transform the original data set to include the composite features. The model augmentation engine 130 can provide the augmented data set to the presentation controller 140 in whole or in part. Thus, the model augmentation engine can provide a technical improvement to at least add and update composite features for a data set at a speed, and scale beyond the capability of manual processes. For example, this technical solution can provide a technical improvement to add or update one or more time-series composite features based on at a speed that provides near-instant feedback for complex systems beyond the capability of manual processes to timely analyze before conditions for response become obsolete.

The presentation controller 140 can generate instructions to operate, activate, and modify a user interface located locally or remotely from the data processing system 102. The presentation controller 140 can provide, for example, instructions by an API including a data set or portions thereof, features, or portions thereof, models, or portions thereof, and lag parameters, or any portion thereof, or any combination thereof, to the client computing system 103.

The cloud data repository 150 can store data associated with the system 100. The cloud data repository 150 can include one or more hardware memory devices to store binary data, digital data, or the like. The cloud data repository 150 can include one or more electrical components, electronic components, programmable electronic components, reprogrammable electronic components, integrated circuits, semiconductor devices, flip flops, arithmetic units, or the like. The cloud data repository 150 can include at least one of a non-volatile memory device, a solid-state memory device, a flash memory device, and a NAND memory device. The cloud data repository 150 can include one or more addressable memory regions disposed on one or more physical memory arrays. A physical memory array can include a NAND gate array disposed on, for example, at least one of a particular semiconductor device, integrated circuit device, and printed circuit board device. The cloud data repository 150 can include timestamped data storage 152, model storage 154, feature storage 156, and lag parameter storage 158.

The timestamped data storage 152 can store data sets having timestamped data points or groups of data points. For example, the data sets can include tabular data including multiple data rows each corresponding to a particular data point, and multiple columns each corresponding to a particular feature corresponding to the data points. For example, each cell in the data set can correspond to a particular feature of a particular data point. Where a cell has a value, the data point have a value corresponding to the feature. The model storage 154 can store models trained by machine learning to execute performance output based on data sets of the timestamped data storage 152. The models can include timestamped data processing features, metrics, weights, filters, or any combination thereof, to generate performances compatible with various temporal properties or lag parameters. The model storage 154 can thus store models with a technical improvement to use machine learning to generate performance output that can create predictions based on varying distances between timestamps in a data set.

The feature storage 156 can store features or groups of features generated by and testable by the time-series transform engine 122. The feature storage 156 can include a memory space for testing models with composite features and generating augmented data sets for validation against accuracy thresholds. The lag parameter storage 158 can store accuracy metrics and accuracy thresholds. For example, the lag parameter storage 158 can store an accuracy metric generated in response to a validation by impact processing operation, and can store accuracy thresholds. Accuracy thresholds can be selectable based, for example, on a temporal property.

The client computing system 103 can include a computing system located remotely from the data processing system 102. The client computing system 103 can include a user interface engine. The user interface engine 160 can present a user interface, including at least a graphical user interface. The user interface engine 160 can be operatively coupleable with a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The system processor 110 can present, by the user interface, a plurality of lag time windows including the lag time window. The processor can obtain, by the user interface, a selection indicating the lag time window. The lag time window can correspond to an offset between one or more first timestamps of the first plurality of features and one or more second timestamps of the compatible fields in the first data set, the offset comprising a timestamp value or range or timestamp values. The data processing system 102 can present, by the user interface, a plurality of lag time windows including the lag time window. The data processing system 102 can obtain, by the user interface, a selection indicating the lag time window.

For example, the cloud data repository 150 can correspond to a computer readable medium that can include one or more instructions executable by a processor. The processor can obtain, by the user interface, a join key identifying the compatible fields. The processor can present, by the user interface, a plurality of lag time windows can include the lag time window. The processor can obtain, by the user interface, a selection indicating the lag time window.

The data processing system 102 can extract a fourth plurality of features from the first data set. The data processing system can determine a second lag time window based at least in part on the fourth plurality of features. The data processing system 102 can generate, based on the second lag time window, a fourth data set via aggregation of compatible fields in the first data set corresponding to the fourth plurality of features. The data processing system 102 can join the fourth data set with the third data set or the first data set to create a fifth data set.

The data processing system 102 can extract a fifth plurality of features from the fifth data set. The data processing system 102 can augment the first plurality of features extracted from the first data set with the fifth plurality of features extracted from the fifth data set. The data processing system 102 can update, via machine learning, a model with the fifth plurality of features. The data processing system 102 can instruct a user interface to present at least one performance of the model with the fifth plurality of features.

The data processing system 102 can obtain, based on data from one or more sensors, the first data set. The data processing system 102 can extract, in response to the obtaining the first data set, the first plurality of features. The data processing system 102 can determine, in response to the obtaining the first data set, the lag time window. The data processing system 102 can generate, in response to the obtaining the first data set and based on the lag time window, the second data set. The data processing system 102 can join, in response to the obtaining the first data set, the second data set with the first data set to create a third data set.

The data processing system 102 can extract, in response to the obtaining the first data set, the second plurality of features. The data processing system 102 can augment, in response to the obtaining the first data set, the first plurality of features with the second plurality of features. The data processing system 102 can update, in response to the obtaining the first data set and via machine learning, the model with the third plurality of features. The data processing system 102 can instruct, in response to the obtaining the first data set, the user interface to present the performance of the model with the third plurality of features.

For example, the data processing system 102 can include each of compatible fields corresponding to a predetermined temporal parameter or a predetermined geographic parameter.

For example, the data processing system 102 can obtain, by the user interface, a join key identifying the compatible fields. For example, the data processing system 102 can present, by the user interface, a plurality of lag time windows can include the lag time window. The system can obtain, by the user interface, a selection indicating the lag time window.

For example, the data processing system 102 can extract a fourth plurality of features from the first data set. The data processing system 102 can determine a second lag time window based at least in part on the fourth plurality of features. The data processing system 102 can generate, based on the second lag time window, a fourth data set via aggregation of compatible fields in the first data set corresponding to the fourth plurality of features. The data processing system 102 can join the fourth data set with the third data set or the first data set to create a fifth data set.

For example, the data processing system 102 can extract a fifth plurality of features from the fifth data set. The data processing system 102 can augment the first plurality of features extracted from the first data set with the fifth plurality of features extracted from the fifth data set. The data processing system 102 can update, via machine learning, a model with the fifth plurality of features. The data processing system 102 can instruct a user interface to present at least one performance of the model with the fifth plurality of features.

For example, the data processing system 102 can include a lag time window corresponding to an offset between one or more first timestamps of the first plurality of features and one or more second timestamps of the compatible fields in the first data set, the offset can include a timestamp value or range or timestamp values.

For example, the data processing system 102 can obtain, based on data from one or more sensors, the first data set. The data processing system 102 can extract, in response to the obtaining the first data set, the first plurality of features. The data processing system 102 can determine, in response to the obtaining the first data set, the lag time window. The data processing system 102 can generate, in response to the obtaining the first data set and based on the lag time window, the second data set. The data processing system 102 can join, in response to the obtaining the first data set, the second data set with the first data set to create a third data set.

For example, the data processing system 102 can extract, in response to the obtaining the first data set, the second plurality of features. The data processing system 102 can augment, in response to the obtaining the first data set, the first plurality of features with the second plurality of features. The data processing system 102 can update, in response to the obtaining the first data set and via machine learning, the model with the third plurality of features. The data processing system 102 can instruct, in response to the obtaining the first data set, the user interface to present the performance of the model with the third plurality of features.

Figure 2:
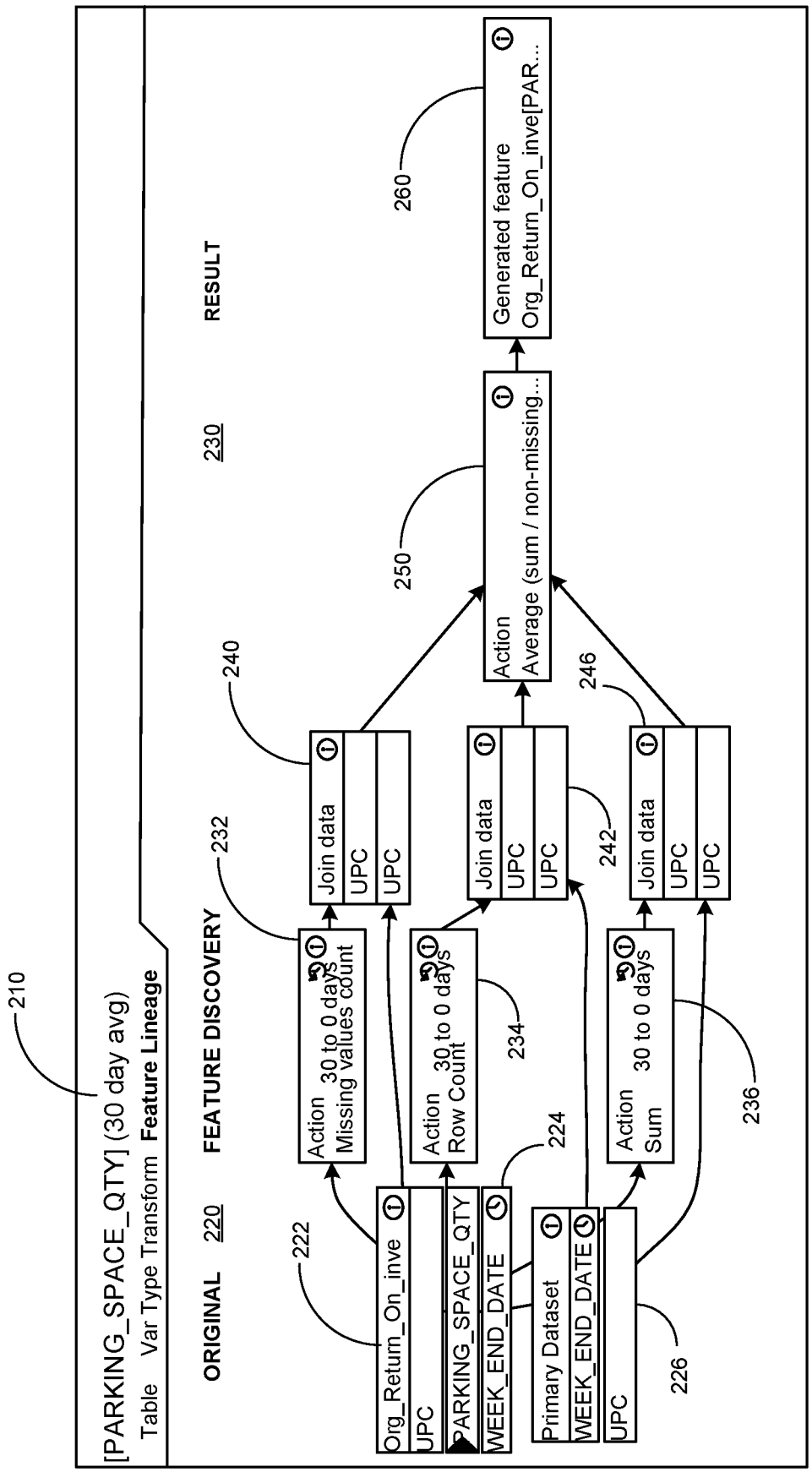
FIG. 2 illustrates a user interface to perform feature discovery and a self-join operation based on a first example join key and a first example lag window.

FIG. 2 illustrates a user interface to perform feature discovery and a self-join operation based on a first example join key and a first example lag window. As illustrated by way of example in FIG. 2, an example user interface 200 can include a join key presentation 210, an original data set presentation 220, a feature discovery presentation 230, and a result presentation 260. For example, a user interface can present a performance indicating a prediction on "Return on Space" for a brick and mortar retail chain. The performance can include predicting profit made for per unit of aisle space occupied by different good sold by a retail chain across different locations. A dataset can have one or more rows each including a level item ID and date. This technical solution can, for example, capture delayed effects of different features like price, promotions and location based characteristics on the amount of profit made per unit of aisle space. For example, if the price of an item is increased by 50% over a quarter then that would erode the demand for that item and thereby might increase the profit per aisle space even though fewer units may be sold. Thus, this technical solution can provide a technical improvement of at least generating time-based features for the base features in the dataset by self join operations that create these features and augment the primary dataset.

The join key presentation 210 can present an indication of a join key that can be obtained as input to a particular feature discovery and self-join process. The join key presentation 210 can correspond to a particular join key that indicates a particular feature and a particular temporal property. For example, the join key presentation 210 can present a join key for a quantity of parking spaces and a temporal property of a 30 day average. The original data set presentation 220 can correspond to particular aspects of an input data set corresponding to the join key. The original data set presentation can include a series identifier presentation 222, a temporal marker 224, and an input data set presentation 226. The series identifier presentation 222 can correspond to a particular series to be generated as output of a performance of a model trained using machine learning. For example, the series identifier presentation 222 can identify a return on investment series to be modeled based on the parking space quantity join key. The temporal marker 224 can correspond to a particular timestamp or time offset indicating a temporal boundary of the data set for ingestion. The temporal marker 224 can correspond, for example to a latest timestamp, an earliest timestamp, or a particular offset from a predetermined timestamp. The input data set presentation 226 can identify an input data set and various features or columns thereof compatible with the series and the temporal marker 224.

The feature discovery presentation 230 can present an indication of particular transformations corresponding to features to be generated by the feature discovery process. A transformation can include, for example, a temporal property indicating compatibility with one or more of the series, the join key, or the temporal marker 224. The feature discovery presentation 230 can include lag window identification presentations 232, 234 and 236, and the action presentation 250. The lag window identification presentations 232, 234 and 236 can respectively correspond to transformations to generate particular composite features based on the series, the join key, and the temporal marker 224. For example, the lag window identification presentation 232 can correspond to a feature having a value corresponding to missing values over the preceding 30 day period, indicating non-use of a particular number of parking spaces. For example, the lag window identification presentation 234 can correspond to a feature having a value corresponding to a row count over the preceding 30 day period, indicating use of a particular number of parking spaces. For example, the lag window identification presentation 236 can correspond to a feature having a value corresponding to a sum over the preceding 30 day period, indicating revenue from all parking spaces over the preceding 30 day period. The join operators 240, 242 and 246 can each generate queries to execute a feature generation process respectively for each of the lag window identification presentations 232, 234 and 236.

The action presentation 250 can present an indication of particular transformations corresponding to features to be generated by the feature discovery process. For example, the action presentation 250 can present a transformation indicating an average of the sum of used parking spaces over the preceding 30 day period. The feature discovery process, by the time-series transform engine 122, can obtain an input by the user interface identifying the transformation, or can generate the transformation. The result presentation 260 can present an indication of generation of a particular composite feature by the feature discovery process. For example, the result presentation 260 can generate a composite feature in accordance with the transformation of the action presentation 250, and can generate a feature having values in accordance with the transformation.

Figure 3:
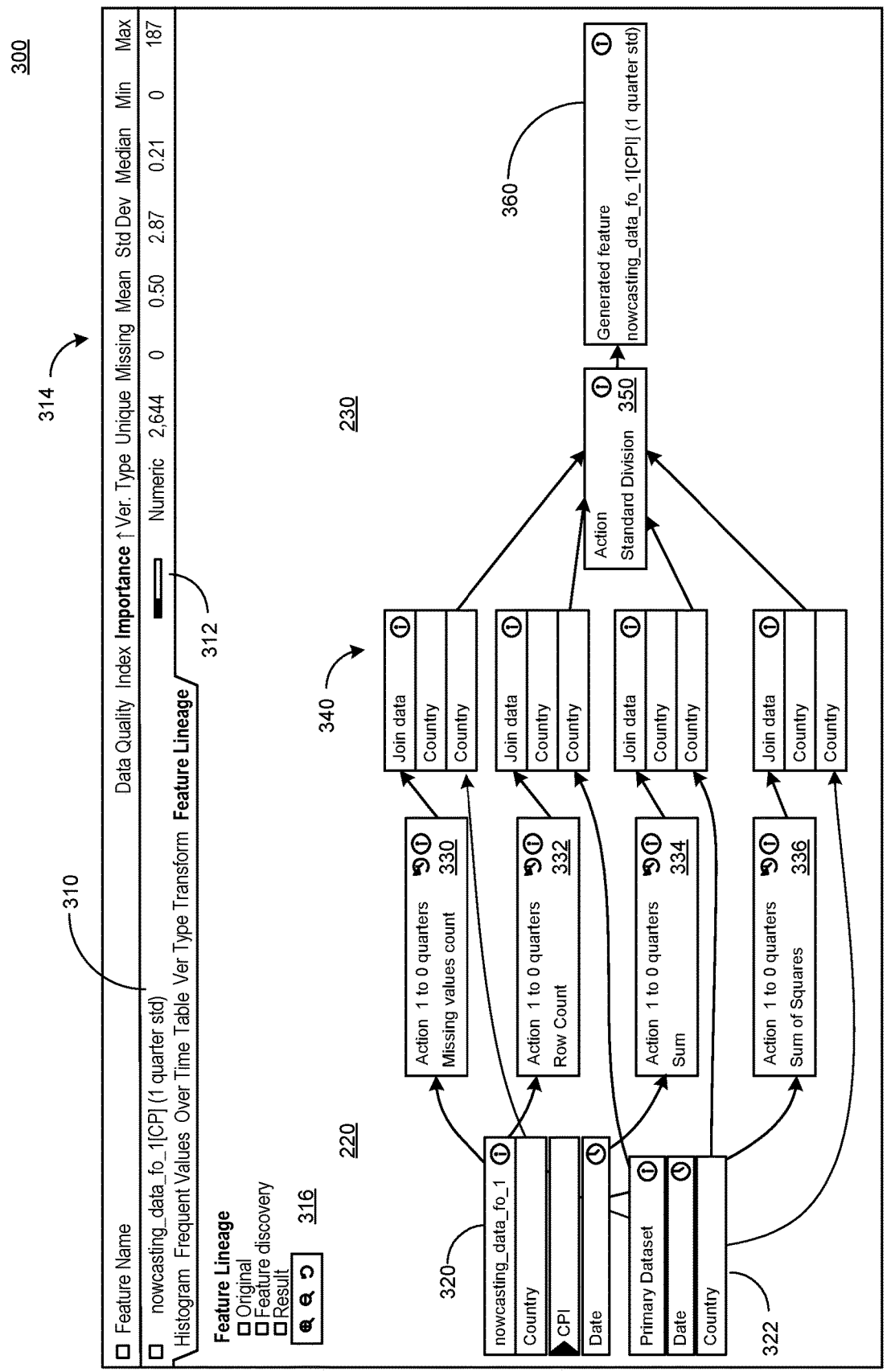
FIG. 3 illustrates a user interface to perform feature discovery and a self-join operation based on a second example join key and a second example lag window.

FIG. 3 illustrates a user interface to perform feature discovery and a self-join operation based on a second example join key and a second example lag window. As illustrated by way of example in FIG. 3, an example user interface 300 can include a join key presentation 310, the original data set presentation 220, the feature discovery presentation 230, an impact presentation 312, a feature metrics presentation 314, a feature lineage presentation 316, and a result presentation 360.

The join key presentation 310 can present an indication of a join key that can be obtained as input to a particular feature discovery and self-join process. The join key presentation 310 can correspond to a particular join key that indicates a particular feature and a particular temporal property. For example, the join key presentation 310 can present a join key for a consumer price index (CPI) and a temporal property of a calendar quarter time step. The original data set presentation can include a series identifier presentation 320, and an input data set presentation 322. The series identifier presentation 320 can correspond to a particular series to be generated as output of a performance of a model trained using machine learning. For example, the series identifier presentation 320 can identify a current CPI value to be modeled based on the CPI join key. The input data set presentation 226 can identify an input data set and various features or columns thereof compatible with the series and the temporal property.

The feature discovery presentation 230 can include lag window identification presentations 330, 332, 334 and 336, the join operators 340, and the action presentation 350. The lag window identification presentations 330, 332, 334 and 336 can respectively correspond to transformations to generate particular composite features based on the series, the join key, and the temporal property. For example, the lag window identification presentation 330 can correspond to a feature having a value corresponding to missing values over the preceding calendar quarter, indicating lack of availability of CPI data. For example, the lag window identification presentation 332 can correspond to a feature having a value corresponding to a row count over the preceding calendar quarter, indicating availability of CPI data. For example, the lag window identification presentation 334 can correspond to a feature having a value corresponding to a sum over the preceding calendar quarter, indicating known CPI values over the preceding calendar quarter. For example, the lag window identification presentation 336 can correspond to a feature having a value corresponding to a sum of squares over the preceding calendar quarter, indicating a stochastic property indicative of the CPI values over the preceding calendar quarter. The join operators 340 can each generate queries to execute a feature generation process respectively for each of the lag window identification presentations 330, 332, 334 and 336.

The action presentation 350 can present an indication of particular transformations corresponding to features to be generated by the feature discovery process. For example, the action presentation 350 can present a transformation indicating a standard deviation of CPI over the preceding calendar quarter. The feature discovery process, by the time-series transform engine 122, can obtain an input by the user interface identifying the transformation, or can generate the transformation. The result presentation 360 can present an indication of generation of a particular composite feature by the feature discovery process. For example, the result presentation 360 can generate a composite feature in accordance with the transformation of the action presentation 350, and can generate a feature having values in accordance with the transformation. For example, a presentation can include an indication that a created feature corresponds to a 1 year sum of a Treasury bond rate of a country.

Figure 4:
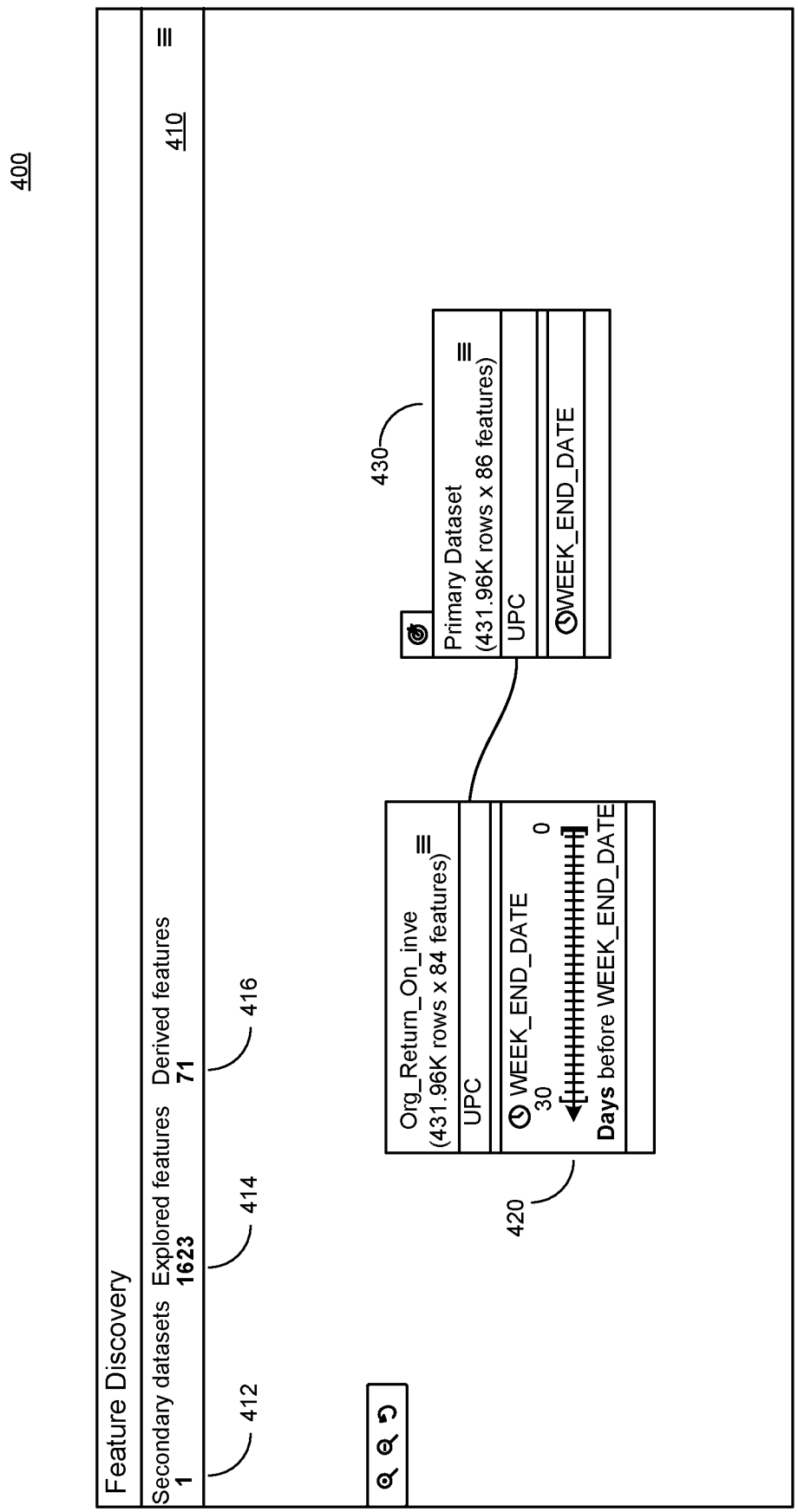
FIG. 4 illustrates a user interface to perform feature discovery based on a single example lag window.

FIG. 4 illustrates a user interface to perform feature discovery based on a single example lag window. As illustrated by way of example in FIG. 4, an example user interface 400 can include a feature discovery presentation 410, a temporal parameter presentation 420, and an input data set presentation 430. The feature discovery presentation 410 can include a dataset indicator 412, a feature indicator 414, and a derived feature indicator 416.

The feature discovery presentation 410 can present indications corresponding to particular characteristics of a feature discovery process in accordance with present implementations. The dataset indicator 412 can indicate a number of data sets obtained as input by the feature discovery process. For example, the dataset indicator 412 can indicate that 1 data set has been obtained as input. The feature indicator 414 can indicate a number of features of the input data sets processed by the feature discovery process. For example, the feature indicator 414 can indicate that 1,623 features of the data set have been processed or can be processed. The derived feature indicator 416 can indicate a number of derived or composite features generated based on features of the input data sets processed by the feature discovery process. For example, the derived feature indicator 416 can indicate that 71 features have been derived based on the data set and the explored feature thereof. A derived feature can correspond to a composite feature. The temporal parameter presentation 420 can present indications corresponding to particular temporal properties. The temporal properties can include, for example a time period, a time step, and a time boundary. For example, the temporal parameter presentation 420 can be present a time period of 30 days bounded by a current day and a day 30 days in the past, with a time step of 1 day. The input data set presentation 430 can identify an input data set and various features or columns thereof compatible with one or more temporal properties of the temporal parameter presentation 420.

Figure 5:
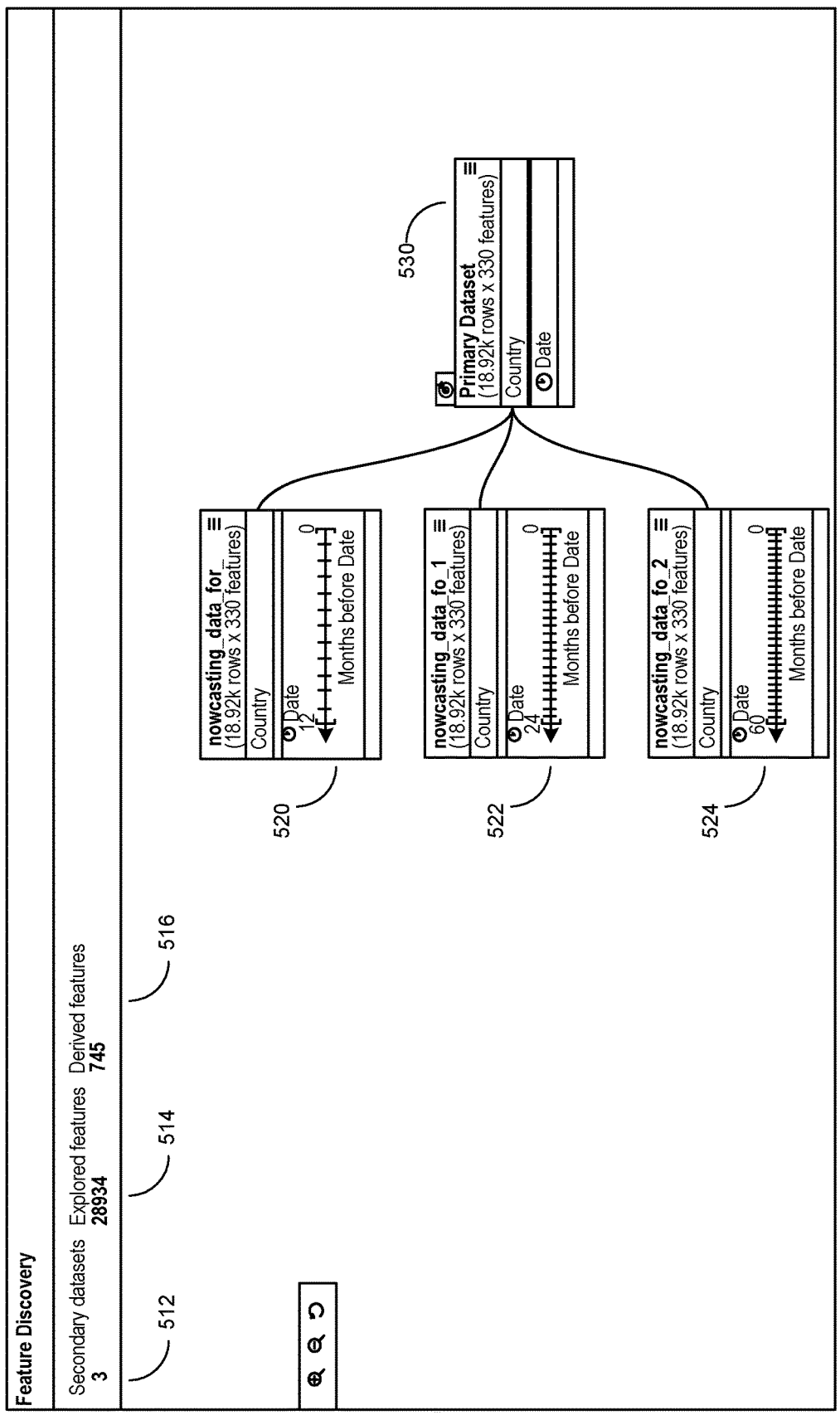
FIG. 5 illustrates a user interface to perform feature discovery based on a plurality of distinct example lag windows.

FIG. 5 illustrates a user interface to perform feature discovery based on a plurality of distinct example lag windows. As illustrated by way of example in FIG. 5 an example user interface 500 can include a feature discovery presentation 510, temporal parameter presentations 520, 522 and 524, and an input data set presentation 530. The feature discovery presentation 510 can include a dataset indicator 512, a feature indicator 514, and a derived feature indicator 516.

The feature discovery presentation 510 can present indications corresponding to particular characteristics of a feature discovery process in accordance with present implementations. The dataset indicator 512 can indicate a number of data sets obtained as input by the feature discovery process. For example, the dataset indicator 512 can indicate that 3 secondary data sets have been obtained as input. A secondary dataset can include a data set distinct from a primary data set or generated based on a data set itself generated by a feature discovery process. The feature indicator 614 can indicate a number of features of the input data sets processed by the feature discovery process. For example, the feature indicator 614 can indicate that 28,934 features of the data set have been processed or can be processed. The derived feature indicator 516 can indicate a number of derived or composite features generated based on features of the input data sets processed by the feature discovery process. For example, the derived feature indicator 516 can indicate that 745 features have been derived based on the data sets and the explored feature thereof.

The temporal parameter presentations 520, 522 and 524 can present indications corresponding to particular temporal properties. For example, the temporal parameter presentation 520 can present a time period of 12 months bounded by a current month and a month 12 months in the past, with a time step of 1 month. For example, the temporal parameter presentation 522 can present a time period of 24 months bounded by a current month and a month 24 months in the past, with a time step of 1 month. For example, the temporal parameter presentation 524 can present a time period of 60 months bounded by a current month and a month 60 months in the past, with a time step of 1 month. Thus, the feature discovery process can generate a greater number of features each corresponding to particular permutations of time. For example, the feature discovery process can generate three features that each respectively cover the preceding 12, 24 and 60 months.

The input data set presentation 530 can identify an input data set and various features or columns thereof compatible with one or more temporal properties of, for example, a corresponding one of the temporal parameter presentations 520, 522 and 524.

Figure 6:
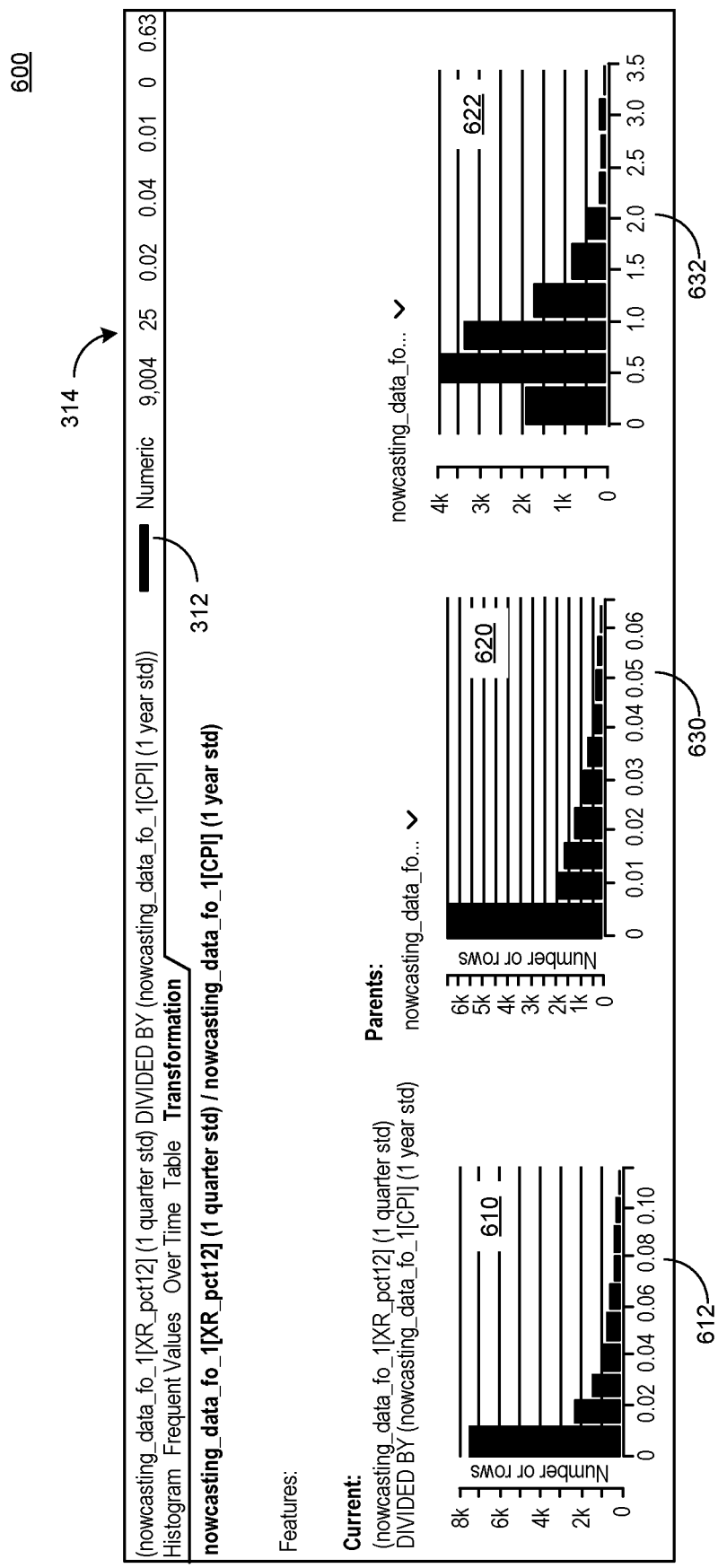
FIG. 6 illustrates a user interface to present features corresponding to data sets input to and output from an example feature discovery and self-join operation process.

FIG. 6 illustrates a user interface to present features corresponding to data sets input to and output from an example feature discovery and self-join operation process. As illustrated by way of example in FIG. 6, an example user interface 600 can include the impact presentation 312, the feature metrics presentation 314, a current feature impact presentation 610, and a plurality of parent feature impact presentations 620 and 622. The current feature impact presentation 610 can present a distribution 612 of one or more features of an augmented data set, including one or more composite features and features of an original data set. The plurality of parent feature impact presentations 620 and 622 can each present respective distributions 630 and 632 of one or more features of various input data sets.

Figure 7:
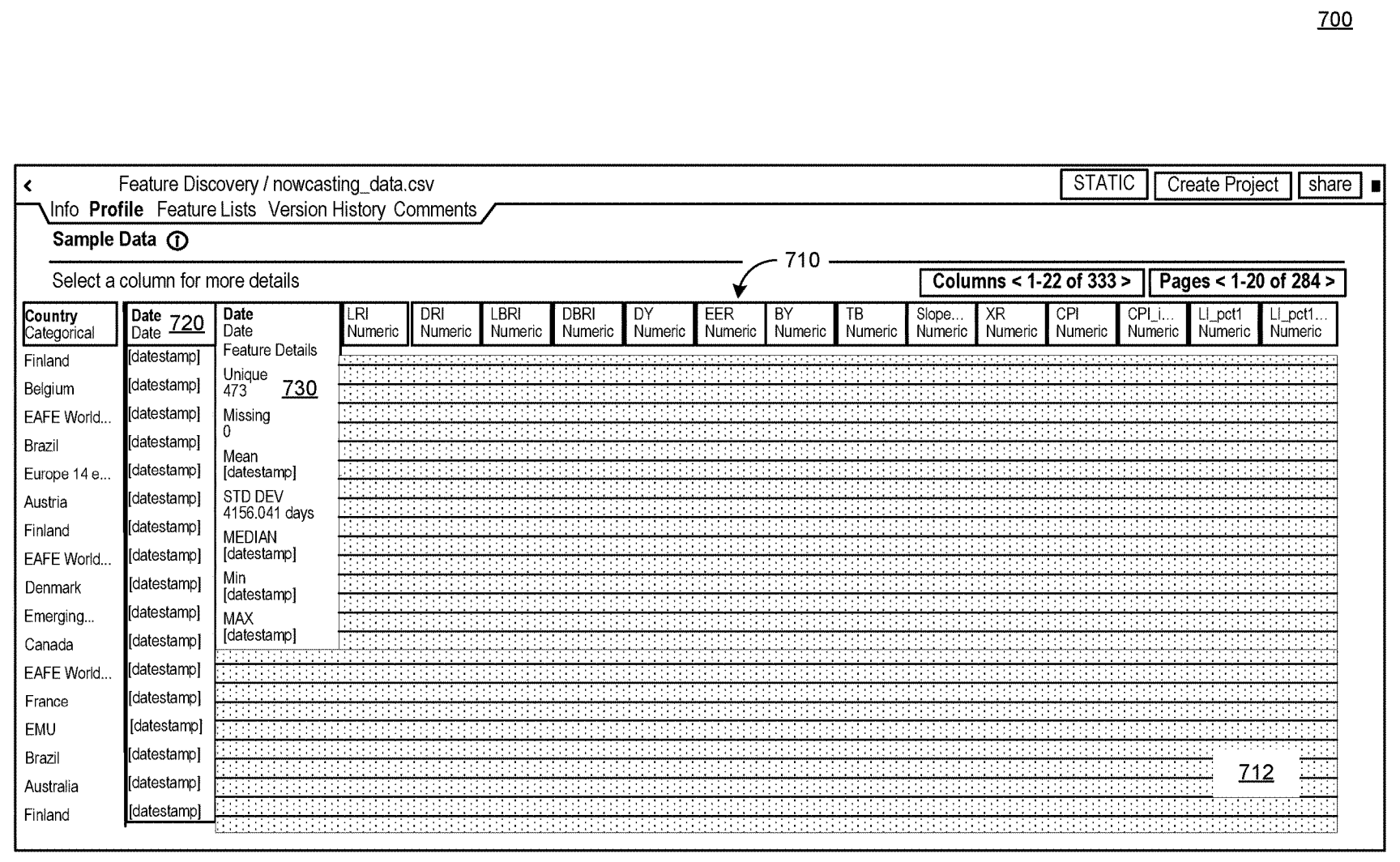

FIG. 7 illustrates a user interface to present a first example data structure in accordance with present implementations. As illustrated by way of example in FIG. 7, an example user interface 700 can include a feature identification presentation 710, a data presentation 712, a temporal property presentation 720, and a temporal parameter presentation 730.

The feature identification presentation 710 can present features as columns of a tabular data set. The data presentation 712 can present cells of one or more rows and columns of a tabular data set. The temporal property presentation 720 can present temporal cell values corresponding to particular data points. For example, each data point can correspond to a row having a particular datestamp, and each datestamp can be presented by the temporal property presentation 720 as a column. The temporal parameter presentation 730 can present metrics based on the datestamp associated with one or cells. For example, the temporal parameter presentation 730 can present, for a particular feature a mean, standard deviation, median, minimum, and maximum datestamp. The data set can include multiple columns of datestamps each presented upon selection in accordance with user interface 700, for example.

Figure 8:
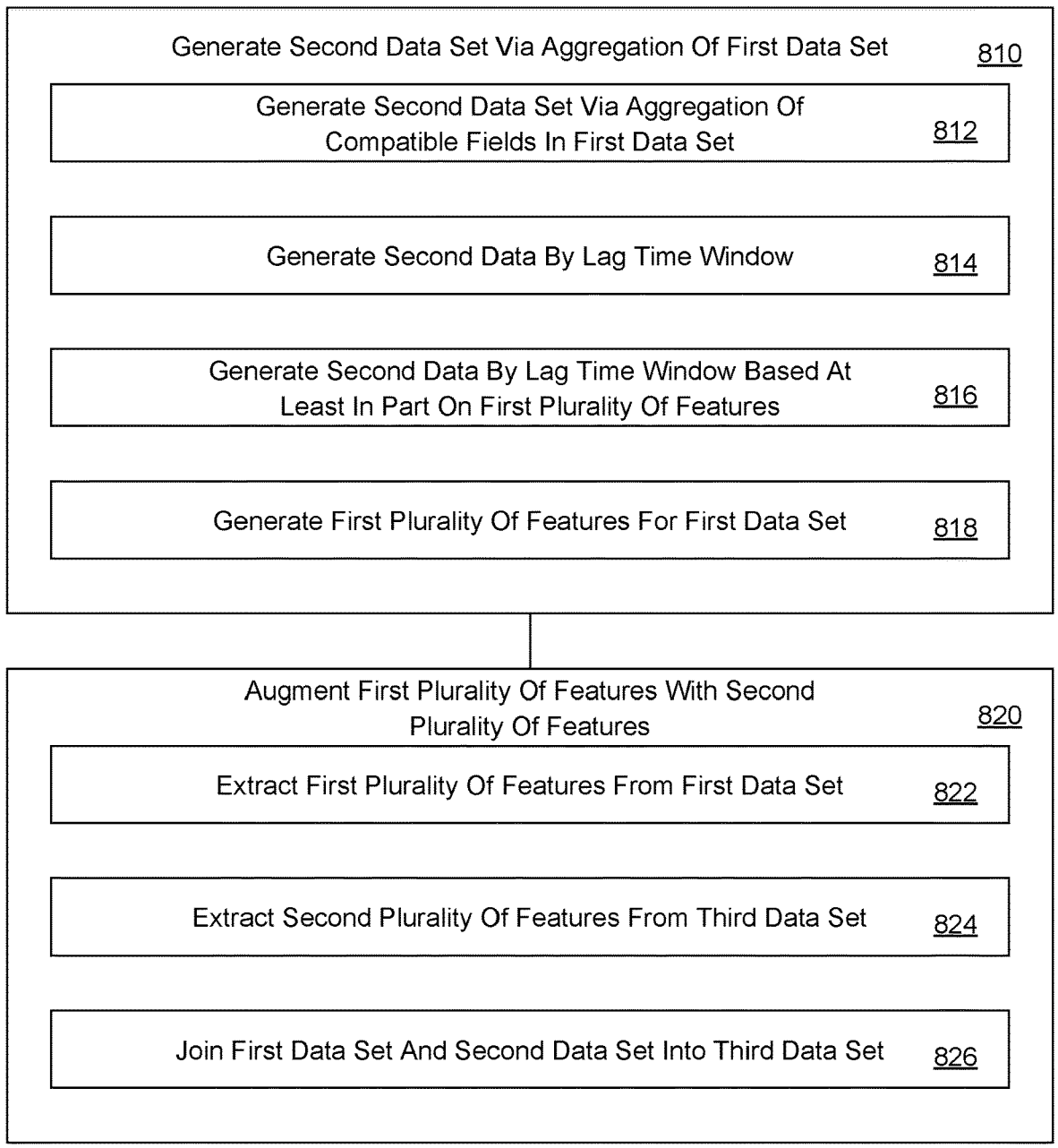
FIG. 8 illustrates a method of automated feature discovery by self-join operations in accordance with present implementations.

FIG. 8 illustrates a method of automated feature discovery by self-join operations in accordance with present implementations. The system 100 and the user interfaces 200-700 can perform method 800 according to present implementations. For example, this technical solution can provide at least a technical improvement to identify and augment a data set with features beyond the capability of manual processes, to respond to complex behavior of large-scale environments at a rate far exceeding manual processes. For example, the technical solution can provide at least a technical improvement to modify a performance of a model according to composite features that change multiple times per second. For example, the technical solution can provide at least a technical improvement to generate, modify, or regenerate augmented features for a large data set representing a substantial fraction of stocks, inventory, or the like, for a country or geography, based on the composite features multiple times per second. For example, a rate can correspond to a frequency of updating, and can be measured in Hz.

For example, the method can include can include obtaining, based on data from one or more sensors, the first data set, extracting, in response to the obtaining the first data set, the first plurality of features. The method can include determining, in response to the obtaining the first data set, the lag time window. The method can include generating, in response to the obtaining the first data set and based on the lag time window, the second data set. The method can include joining, in response to the obtaining the first data set, the second data set with the first data set to create a third data set.

At 810, the method 800 can generate a second data set via aggregation of a first data set. At 812, the method 800 can generate the second data set via aggregation of compatible fields in the first data set. For example, the method can include each of the compatible fields corresponding to a predetermined temporal parameter or a predetermined geographic parameter. For example, the method can include obtaining, by the user interface, a join key identifying the compatible fields. At 814, the method 800 can generate the second data according to a lag time window. For example, the method can include presenting, by the user interface, a plurality of lag time windows can include the lag time window. The method can include obtaining, by the user interface, a selection indicating the lag time window. For example, the method can include the lag time window corresponding to an offset between one or more first timestamps of the first plurality of features and one or more second timestamps of the compatible fields in the first data set, the offset can include a timestamp value or range or timestamp values. At 816, the method 800 can generate the second data according to a lag time window based at least in part on a first plurality of features. At 818, the method 800 can generate the first plurality of features for a first data set.

For example, the method can include extracting a fourth plurality of features from the first data set. The method can include determining a second lag time window based at least in part on the fourth plurality of features. The method can include generating, based on the second lag time window, a fourth data set via aggregation of compatible fields in the first data set corresponding to the fourth plurality of features. The method can include joining the fourth data set with the third data set or the first data set to create a fifth data set. For example, the method can include extracting a fifth plurality of features from the fifth data set. The method can include augmenting the first plurality of features extracted from the first data set with the fifth plurality of features extracted from the fifth data set. The method can include updating, via machine learning, a model with the fifth plurality of features. The method can include instructing a user interface to present at least one performance of the model with the fifth plurality of features.

At 820, the method 800 can augment the first plurality of features with a second plurality of features. At 822, the method 800 can extract the first plurality of features from the first data set. At 824, the method 800 can extract the second plurality of features from a third data set. For example, the method can include extracting, in response to the obtaining the first data set, the second plurality of features. The method can include augment, in response to the obtaining the first data set, the first plurality of features with the second plurality of features. The method can include update, in response to the obtaining the first data set and via machine learning, the model with the third plurality of features. The method can include instruct, in response to the obtaining the first data set, the user interface to present the performance of the model with the third plurality of features. At 826, the method 800 can join the first data set and the second data set into the third data set. For example, a join can correspond to a join operation of a database system.

Figure 9:
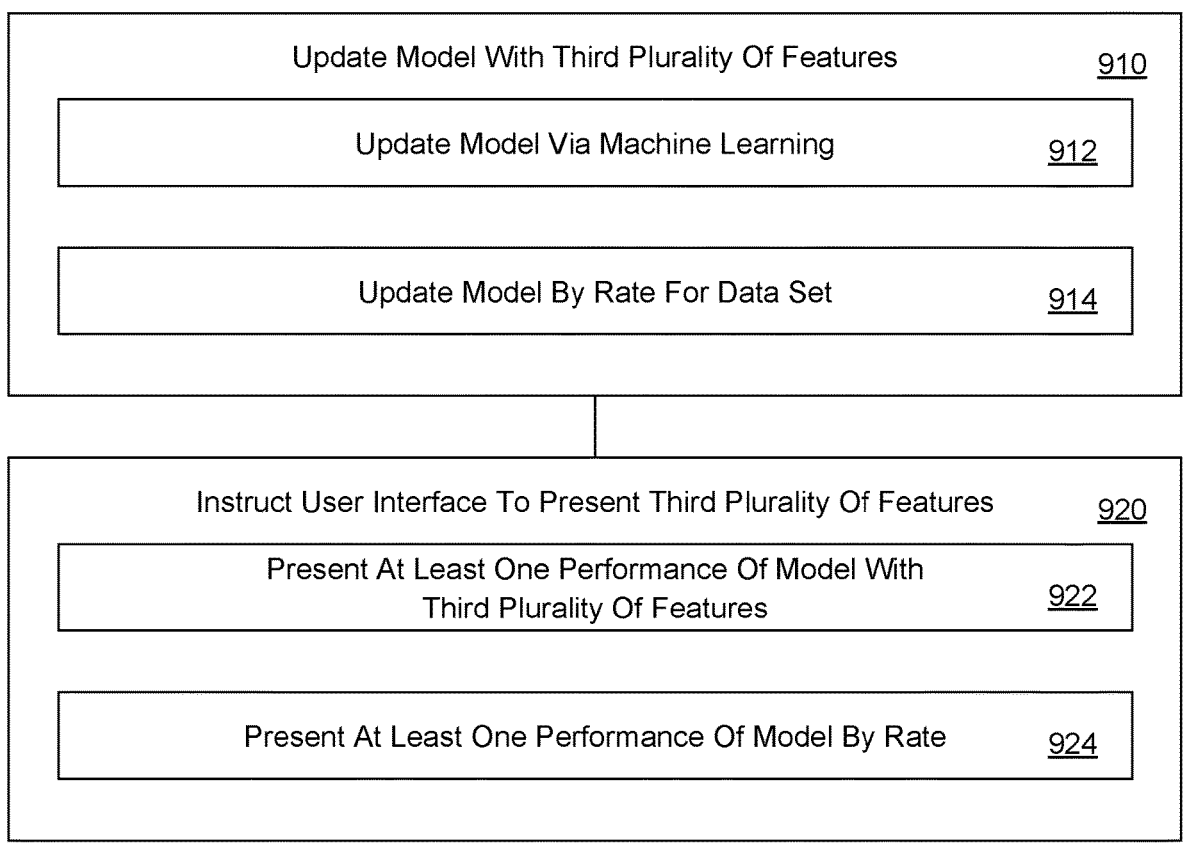
FIG. 9 illustrates a method of automated feature discovery by self-join operations in accordance with present implementations.

FIG. 9 illustrates a method of automated feature discovery by self-join operations in accordance with present implementations. The system 100 and the user interfaces 200-700 can perform method 900 according to present implementations. The method 900 can begin at 902. The method 900 can then continue to 910.

At 910, the method 900 can update a model with a third plurality of features. At 912, the method 900 can update the model via machine learning. At 914, the method 900 can update the model according to a rate for the data set. For example, a rate can correspond to a rate of availability of new data from one or more external data sources. For example, new data can correspond to updated values of one or more data sets or data elements of one or more data sets. For example, a rate can correspond to a polling frequency or a push trigger to obtain at least a portion of a data asset. For example, a rate can be based on a number of one or more processors or one or more cores corresponding to one or more processors. For example, a rate can be based on type of data set. For example, a rate can be based on an architecture of one or more processors or one or more cores corresponding to one or more processors. For example, a rate can be increased by allocating one or more portions of a data set to one or more corresponding processors or processor cores corresponding to one or more system processors 110 or portions thereof.

At 920, the method 900 can instruct a user interface to present the third plurality of features. At 922, the method 900 can present at least one performance of the model with the third plurality of features. At 924, the method 900 can present at least one performance of the model according to the rate.

The herein described subject matter sometimes illustrates different components contained within, or connected with, different other components. Such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, contemplate the possibilities of including one of the terms, either of the terms, or both terms. For example, the phrase "A or B" include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system, comprising:
one or more memory devices storing instructions; and
one or more processors configured to execute the instructions to perform operations including:
generating, according to a lag time window based at least in part on a first plurality of features, a second data set via aggregation of compatible fields in the first data set, the first plurality of features corresponding to a first data set;
augmenting the first plurality of features extracted from the first data set with a second plurality of features extracted from a third data set, the third data set corresponding to a join of the first data set and the second data set;
updating, via machine learning and according to a rate corresponding to the data set, a model with the third plurality of features; and
instructing a user interface to present at least one performance of the model with the third plurality of features, according to the rate.

2. The system of claim 1, each of the compatible fields corresponding to a predetermined temporal parameter or a predetermined geographic parameter.

3. The system of claim 1, the operations further including:
obtaining, by the user interface, a join key identifying the compatible fields.

4. The system of claim 1, the operations further including:
presenting, by the user interface, a plurality of lag time windows including the lag time window; and
obtaining, by the user interface, a selection indicating the lag time window.

5. The system of claim 1, the operations further including:
extracting a fourth plurality of features from the first data set;
determining a second lag time window based at least in part on the fourth plurality of features;
generating, based on the second lag time window, a fourth data set via aggregation of compatible fields in the first data set corresponding to the fourth plurality of features; and
joining the fourth data set with the third data set or the first data set to create a fifth data set.

6. The system of claim 5, the operations further including:
extracting a fifth plurality of features from the fifth data set;
augmenting the first plurality of features extracted from the first data set with the fifth plurality of features extracted from the fifth data set;
updating, via machine learning, a model with the fifth plurality of features; and
instructing a user interface to present at least one performance of the model with the fifth plurality of features.

7. The system of claim 1, the lag time window corresponding to an offset between one or more first timestamps of the first plurality of features and one or more second timestamps of the compatible fields in the first data set, the offset comprising a timestamp value or range or timestamp values.

8. The system of claim 1, the operations further including:
obtaining, based on data from one or more sensors, the first data set;
extracting, in response to the obtaining the first data set, the first plurality of features;
determining, in response to the obtaining the first data set, the lag time window;
generating, in response to the obtaining the first data set and based on the lag time window, the second data set; and
joining, in response to the obtaining the first data set, the second data set with the first data set to create a third data set.

9. The system of claim 8, the operations further including:
extracting, in response to the obtaining the first data set, the second plurality of features;
augmenting, in response to the obtaining the first data set, the first plurality of features with the second plurality of features;
updating, in response to the obtaining the first data set and via machine learning, the model with the third plurality of features; and
instructing, in response to the obtaining the first data set, the user interface to present the performance of the model with the third plurality of features.

10. A method, comprising:
generating, according to a lag time window based at least in part on a first plurality of features, a second data set via aggregation of compatible fields in the first data set, the first plurality of features corresponding to a first data set;
augmenting the first plurality of features extracted from the first data set with a second plurality of features extracted from a third data set, the third data set corresponding to a join of the first data set and the second data set;
updating, via machine learning and according to a rate corresponding to the data set, a model with the third plurality of features; and
instructing a user interface to present at least one performance of the model with the third plurality of features, according to the rate.

11. The method of claim 10, each of the compatible fields corresponding to a predetermined temporal parameter or a predetermined geographic parameter.

12. The method of claim 10, comprising:
obtaining, by the user interface, a join key identifying the compatible fields.

13. The method of claim 10, comprising:
presenting, by the user interface, a plurality of lag time windows including the lag time window; and
obtaining, by the user interface, a selection indicating the lag time window.

14. The method of claim 10, comprising:
extracting a fourth plurality of features from the first data set;
determining a second lag time window based at least in part on the fourth plurality of features;
generating, based on the second lag time window, a fourth data set via aggregation of compatible fields in the first data set corresponding to the fourth plurality of features; and
joining the fourth data set with the third data set or the first data set to create a fifth data set.

15. The method of claim 14, comprising:
extracting a fifth plurality of features from the fifth data set;
augmenting the first plurality of features extracted from the first data set with the fifth plurality of features extracted from the fifth data set;
updating, via machine learning, a model with the fifth plurality of features; and
instructing a user interface to present at least one performance of the model with the fifth plurality of features.

16. The method of claim 10, the lag time window corresponding to an offset between one or more first timestamps of the first plurality of features and one or more second timestamps of the compatible fields in the first data set, the offset comprising a timestamp value or range or timestamp values.

17. The method of claim 10, comprising:
obtaining, based on data from one or more sensors, the first data set;
extracting, in response to the obtaining the first data set, the first plurality of features;
determining, in response to the obtaining the first data set, the lag time window;
generating, in response to the obtaining the first data set and based on the lag time window, the second data set; and
joining, in response to the obtaining the first data set, the second data set with the first data set to create a third data set.

18. The method of claim 17, comprising:
extracting, in response to the obtaining the first data set, the second plurality of features;
augment, in response to the obtaining the first data set, the first plurality of features with the second plurality of features;

update, in response to the obtaining the first data set and via machine learning, the model with the third plurality of features; and instructing, in response to the obtaining the first data set, the user interface to present the performance of the model with the third plurality of features.

19. A non-transitory computer readable medium including one or more instructions stored thereon and executable by a processor to:

generate, by the processor and according to a lag time window based at least in part on a first plurality of features, a second data set via aggregation of compatible fields in the first data set, the first plurality of features corresponding to a first data set;

augment, by the processor, the first plurality of features extracted from the first data set with a second plurality of features extracted from a third data set, the third data set corresponding to a join of the first data set and the second data set;

update, by the processor via machine learning and according to a rate corresponding to the data set, a model with the third plurality of features; and instruct, by the processor, a user interface to present at least one performance of the model with the third plurality of features, according to the rate.

20. The non-transitory computer readable medium of claim 19, wherein the non-transitory computer readable medium further includes one or more instructions executable by the processor to:

obtain, by the user interface, a join key identifying the compatible fields;

present, by the user interface, a plurality of lag time windows including the lag time window; and obtain, by the user interface, a selection indicating the lag time window.

* * * * *